(12) United States Patent
Kawamura

(10) Patent No.: US 9,546,255 B2
(45) Date of Patent: Jan. 17, 2017

(54) DECORATIVE FILM FOR INSERT MOLDING AND DECORATIVE INSERT MOLDED ARTICLE

(71) Applicant: SEIREN CO., LTD., Fukui-shi, Fukui (JP)

(72) Inventor: Akihiro Kawamura, Fukui (JP)

(73) Assignee: SEIREN CO., LTD., Fukui (JP)

( * ) Notice: Subject to any disclaimer, the term of this patent is extended or adjusted under 35 U.S.C. 154(b) by 0 days.

(21) Appl. No.: 14/779,711

(22) PCT Filed: Mar. 3, 2014

(86) PCT No.: PCT/JP2014/001150
§ 371 (c)(1),
(2) Date: Sep. 24, 2015

(87) PCT Pub. No.: WO2014/155976
PCT Pub. Date: Oct. 2, 2014

(65) Prior Publication Data
US 2016/0046777 A1  Feb. 18, 2016

(30) Foreign Application Priority Data
Mar. 28, 2013 (JP) .................. 2013-069604

(51) Int. Cl.
*C08J 7/04* (2006.01)
*C09D 11/101* (2014.01)
(Continued)

(52) U.S. Cl.
CPC ............ *C08J 7/047* (2013.01); *B29C 45/0001* (2013.01); *B29C 45/14688* (2013.01); *B32B 27/08* (2013.01); *B32B 27/20* (2013.01); *B32B 27/302* (2013.01); *B32B 27/308* (2013.01); *B32B 27/36* (2013.01); *B32B 27/365* (2013.01); *B32B 27/40* (2013.01); *C09D 11/101* (2013.01);
(Continued)

(58) Field of Classification Search
CPC ................ B29C 45/14811; B29C 45/14688; B29C 2049/2412; Y10T 428/24802
See application file for complete search history.

(56) References Cited

U.S. PATENT DOCUMENTS 8,945,704 B2 * 2/2015 Shibata .................. B32B 27/08
  428/212
2007/0079928 A1 * 4/2007 Abrams .............. B29C 37/0032
  156/244.11
(Continued)

FOREIGN PATENT DOCUMENTS

JP  2003-145573  5/2003
JP  2003-145574  5/2003
(Continued)

*Primary Examiner* — Betelhem Shewareged
(74) *Attorney, Agent, or Firm* — Norris McLaughlin & Marcus, P.A.

(57) ABSTRACT

To obtain a decorative film for insert molding, which is decorated by an ultraviolet curing ink-jet ink, and which exhibits excellent flexibility upon insert molding. A decorative film for insert molding, having on a film substrate a decorative layer formed from an ultraviolet curing ink-jet ink, wherein the elongation of the decorative film for insert molding is 150% or more under conditions at 180° C. and 50% or more under conditions at 25° C.

8 Claims, 2 Drawing Sheets

(51) Int. Cl.

| | |
|---|---|
| *C09D 11/30* | (2014.01) |
| *B29C 45/00* | (2006.01) |
| *B32B 27/08* | (2006.01) |
| *B32B 27/40* | (2006.01) |
| *B32B 27/20* | (2006.01) |
| *B32B 27/30* | (2006.01) |
| *B32B 27/36* | (2006.01) |
| *B29C 45/14* | (2006.01) |
| *B29K 675/00* | (2006.01) |
| *B29L 31/30* | (2006.01) |
| *B29L 31/34* | (2006.01) |
| *B29L 31/00* | (2006.01) |

(52) U.S. Cl.
CPC .... *C09D 11/30* (2013.01); *B29C 2045/14704* (2013.01); *B29C 2045/14713* (2013.01); *B29K 2675/00* (2013.01); *B29L 2031/30* (2013.01); *B29L 2031/34* (2013.01); *B29L 2031/762* (2013.01); *B32B 2264/102* (2013.01); *B32B 2264/104* (2013.01); *B32B 2307/4023* (2013.01); *B32B 2307/54* (2013.01); *B32B 2307/71* (2013.01); *B32B 2307/712* (2013.01); *B32B 2375/00* (2013.01); *B32B 2451/00* (2013.01); *C08J 2433/14* (2013.01)

(56) References Cited

U.S. PATENT DOCUMENTS

| | | | |
|---|---|---|---|
| 2008/0090931 | A1 | 4/2008 | Nagvekar et al. |
| 2008/0118715 | A1* | 5/2008 | Kobayashi .......... B29C 37/0032 428/195.1 |
| 2008/0118718 | A1* | 5/2008 | Koike ............... B29C 45/14811 428/200 |
| 2009/0068418 | A1 | 3/2009 | Iwase et al. |
| 2012/0196095 | A1 | 8/2012 | Tanida et al. |

FOREIGN PATENT DOCUMENTS

| | | |
|---|---|---|
| JP | 2007-056232 | 3/2007 |
| JP | 2008-087248 | 4/2008 |
| JP | 2008-272946 | 11/2008 |
| JP | 2009-051995 | 3/2009 |
| JP | 2010-506966 | 3/2010 |
| JP | 2011-068768 | 4/2011 |
| JP | 2012-153107 | 8/2012 |
| JP | 2013/227515 | 11/2013 |

* cited by examiner

DECORATIVE FILM FOR INSERT MOLDING AND DECORATIVE INSERT MOLDED ARTICLE

TECHNICAL FIELD

The present invention relates to a decorative film suitable for insert molding applications, the decorative film having on a film substrate a decorative layer formed from an ultraviolet curing ink-jet ink. In addition, the present invention relates to an insert molded article using the decorative film.

BACKGROUND ART

Conventionally, as one of methods for decorating the surface of synthetic resin molded articles, a method (insert molding) has been known in which a resin film which has been preliminarily decorated is placed in a mold, and a synthetic resin is injected into the mold so that the decorated resin film is unified with the synthetic resin injection-molded body. Further, the use of an ultraviolet curing ink jet ink in decorating a resin film for use in insert molding has been proposed (for example, Patent Literature 1 to 3).

When a resin film decorated using an ultraviolet curing ink jet ink is used in insert molding, there is a problem, for example, in that the decorative layer cannot withstand stretching during the preforming or injection molding processing, so that a crack is caused in the decorative layer. For solving the problem, for example, Patent Literature 4 has a description that, by using a resin film decorated using an ultraviolet curing ink jet ink containing N-vinylcaprolactam, dicyclopentenyloxyethyl acrylate, and bisphenol A epoxy (meth)acrylate and/or urethane (meth)acrylate, an insert molded article having high image quality can be obtained. However, the Patent Literature 4 has a problem in that a defect, such as a crack, is likely to be caused in the decorative film after the preforming.

CITATION LIST

Patent Literature

PTL 1: JP-A-2003-145573
PTL 2: JP-A-2008-272946
PTL 3: JP-A-2012-153107
PTL 4: JP-A-2008-087248

SUMMARY OF INVENTION

Technical Problem

In view of the above, the present invention has been made, and an object of the invention is to obtain a decorative film for insert molding, which is decorated by an ultraviolet curing ink-jet ink, and which exhibits excellent flexibility upon insert molding.

Solution to Problem

The present invention involves the following embodiments (1) to (5).

(1) A decorative film for insert molding, the decorative film having on a film substrate a decorative layer formed from an ultraviolet curing ink-jet ink, wherein the elongation of the decorative film for insert molding is 150% or more under conditions at 180° C. and 50% or more under conditions at 25° C.

(2) The decorative film for insert molding according to item (1) above, wherein the ultraviolet curing ink-jet ink used in the decorative layer contains a monofunctional monomer having a glass transition temperature (Tg) of: 100° C.<Tg≤200° C., a monofunctional monomer having a Tg of: 0° C.<Tg≤100° C., a monofunctional monomer having a Tg of: Tg≤0° C., an urethane acrylate oligomer, a photopolymerization initiator, and a colorant.

(3) The decorative film for insert molding according to item (2) above, wherein the ultraviolet curing ink-jet ink contains 25 to 45% by mass of the monofunctional monomer having: 100° C,<Tg≤200° C., 2 to 15% by mass of the monofunctional monomer having: 0° C.<Tg≤100° C., 25 to 45% by mass of the monofunctional monomer having: Tg≤0° C., and 5 to 15% by mass of the urethane acrylate oligomer.

(4) The decorative film for insert molding according to item (2) or (3) above, wherein the urethane acrylate oligomer has a coating film elastic modulus of 5 to 50 MPa under conditions at 25° C.

(5) A decorative insert molded article comprising the decorative film according to any one of items (1) to (4) above, and a resin injection-molded body stacked on and unified with one surface of the decorative film.

Advantageous Effects of Invention

According to the present invention, there can be obtained a decorative film for insert molding, which is decorated by an ultraviolet curing ink-jet ink, and which exhibits excellent flexibility upon insert molding.

DESCRIPTION OF EMBODIMENTS

Figure 1:
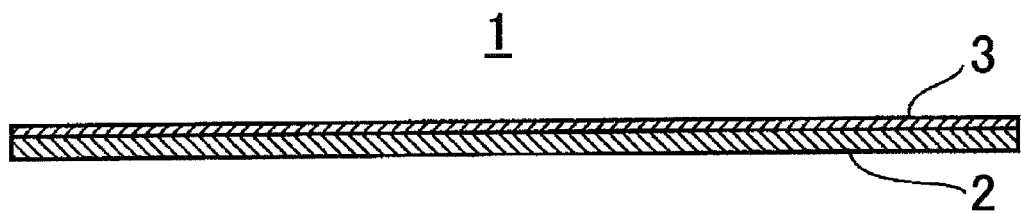
[FIG. 1] A cross-sectional view of a decorative film according to one embodiment.

The decorative film for insert molding according to the present embodiment has on a film substrate a decorative layer formed from an ultraviolet curing ink-jet ink, and has an elongation of 150% or more under conditions at 180° C. and an elongation of 50% or more under conditions at 25° C. The elongation is preferably 180% or more under conditions at 180° C., more preferably 200% or more. Further, the elongation is preferably 80% or more under conditions at 25° C., more preferably 100% or more. When the elongation is less than 150% under conditions at 180° C., there is a possibility that, upon insert molding using a mold having a large depth of draw in a high-temperature atmosphere (for example, upon preforming), the decorative layer or film substrate cannot withstand stretching, so that a crack is caused in the layer or substrate. Further, when the elongation is less than 50% under conditions at 25° C., there is a possibility that a defect, such as a crack, is likely to be caused in the decorative layer or film substrate after preforming or after insert molding. The higher elongation is preferred and therefore, with respect to the upper limit of the elongation, there is no particular limitation, but, for example, the elongation may be 300% or less under conditions at 180° C. and may be 200% or less under conditions at 25° C.

The elongation is an elongation at break, and can be determined by measurement with respect to a decorative film cut into a strip form by means of an autograph at a rate of pulling of 200 mm/min. Details are in accordance with JIS K7127 (specimen type 2).

With respect to the film substrate used in the decorative film for insert molding according to the present embodiment, there is no particular limitation, and, for example, there can be mentioned polycarbonate (PC), polyethylene terephthalate (PET), polymethacrylate, such as polymethyl methacrylate (PMMA), an acrylonitrile-butadiene-styrene copolymer (ABS), and alloys of two or more of the above polymers. Further, laminate materials of the above polymers may be used. Of these, from the viewpoint of adhesion of the ink with the film substrate, the surface of the film substrate to be ink-jet decorated is preferably formed from polycarbonate, polymethacrylate, or an alloy thereof Needless to say, with respect to the elongation of the film substrate per se, it is desired that the elongation is 150% or more under conditions at 180° C. and 50% or more under conditions at 25° C. A preferred range is also similar to that of the elongation of the decorative film, specifically, the elongation of the film substrate per se is preferably 180% or more under conditions at 180° C., more preferably 200% or more, and is preferably 80% or more under conditions at 25° C., more preferably 100% or more. Further, with respect to the upper limit of the elongation, there is no particular limitation, and, for example, the elongation may be 300% or less under conditions at 180° C. and may be 200% or less under conditions at 25° C. Measurement of the elongation of the film substrate per se can be conducted by the same method as mentioned above for the decorative film.

For meeting the above-mentioned elongation of the decorative film for insert molding, as the ultraviolet curing ink-jet ink to be used in the decorative layer, the following is preferably used. Specifically, it is preferred that the ultraviolet curing ink-jet ink used in the decorative layer contains a monofunctional monomer having a glass transition temperature (Tg) of: $100°$ C.$<Tg \leq 200°$ C. (hereinafter, referred to as "high-Tg monofunctional monomer"), a monofunctional monomer having a Tg of: $0°$ C.$<Tg \leq 100°$ C. (hereinafter, referred to as "medium-Tg monofunctional monomer"), a monofunctional monomer having a Tg of: $Tg \leq 0°$ C. (hereinafter, referred to as "low-Tg monofunctional monomer"), an urethane acrylate oligomer, a photopolymerization initiator, and a colorant.

In the present specification, the Tg of a monofunctional monomer means a glass transition temperature of a cured product of the monofunctional monomer. Specifically, the Tg can be measured by differential scanning calorimetry (DSC). A cured product is prepared by adding benzil dimethyl ketal in an amount of 3% by weight, based on the weight of the monofunctional monomer, and curing the resultant by a metal halide lamp in an air atmosphere under conditions such that the peak illuminance is 800 mW/cm$^2$ and the irradiation is 1,000 mJ/cm$^2$. The DSC measurement is conducted using Differential scanning calorimeter Model RDC220, manufactured by Seiko Instruments Inc., in a nitrogen gas flow at a temperature elevation rate of 10° C./min, and a point of inflection of the DSC curve obtained is determined as a Tg.

The high-Tg monofunctional monomer preferably has a Tg of 110 to 160° C. With respect to the high-Tg monofunctional monomer, a monofunctional acrylate monomer or monofunctional acrylamide monomer having a Tg in the above-mentioned range is preferred. Examples include dicyclopentenyl acrylate, dicyclopentanyl acrylate, adamantyl acrylate, acryloylmorpholine, dimethylacrylamide, dimethylaminopropylacrylamide, and isopropylacrylamide, and these can be used individually or two or more of them can be used in combination. Of these, from the viewpoint of less odor or less skin irritating property, acryloylmorpholine is preferred.

The high-Tg monofunctional monomer is preferably contained in the ultraviolet curing ink-jet ink in an amount of 25 to 45% by mass, further preferably 35 to 45% by mass. When the amount of the high-Tg monofunctional monomer contained is 25% by mass or more, the elongation of the decorative layer under conditions at 180° C. can be improved. Further, when the amount of the high-Tg monofunctional monomer contained is 45% by mass or less, a lowering of the elongation of the decorative layer under conditions at 25° C. can be suppressed to avoid the occurrence of a defect, such as a crack caused in the decorative layer or film substrate after preforming or after insert molding.

The medium-Tg monofunctional monomer preferably has a Tg of 30 to 100° C. With respect to the medium-Tg monofunctional monomer, a monofunctional acrylate monomer having a Tg in the above-mentioned range is preferred. Examples include isobornyl acrylate, 4-tert-butylcyclohexanol acrylate, 2-phenoxyethyl acrylate, stearyl acrylate, acryloyloxyethylhexahydrophthalimide, and 2-hydroxy-3-phenoxypropyl acrylate, and these can be used individually or two or more of them can be used in combination. Of these, from the viewpoint of low viscosity or less odor, isobornyl acrylate is preferred.

The medium-Tg monofunctional monomer is preferably contained in the ultraviolet curing ink jet ink in an amount of 2 to 15% by mass, further preferably 2 to 10% by mass. When the amount of the medium-Tg monofunctional monomer contained is in the range of from 2 to 15% by mass, both the elongation of the decorative layer under conditions at 180° C. and the elongation of the decorative layer under conditions at 25° C. can be easily achieved.

With respect to the lower limit of the Tg of the low-Tg monofunctional monomer, there is no particular limitation, and, for example, the lower limit is preferably −60° C. or higher, more preferably −30° C. or higher. With respect to the low-Tg monofunctional monomer, a monofunctional acrylate monomer having a Tg in the above-mentioned range is preferred. Examples include (2-methyl-2-ethyl-1,3-dioxolan-4-yl)methyl acrylate, tetrahydrofurfuryl acrylate, tridecyl acrylate, isooctyl acrylate, lauryl acrylate, and 1,2-ethanediol 1-acrylate 2-(N-butylcarbamate), and these can be used individually or two or more of them can be used in combination. Of these, from the viewpoint of low viscosity and less odor as well as relatively high reactivity, (2-methyl-2-ethyl-1,3-dioxolan-4-yl)methyl acrylate is preferred.

The low-Tg monofunctional monomer is preferably contained in the ultraviolet curing ink-jet ink in an amount of 25 to 45% by mass, further preferably 35 to 45% by mass. When the amount of the low-Tg monofunctional monomer contained is 25% by mass or more, the elongation of the decorative layer under conditions at 25° C. can be improved, so that a crack is unlikely to be caused in the decorative layer or film substrate after preforming or after insert molding. Further, when the amount of the low-Tg monofunctional monomer contained is 45% by mass or less, a lowering of the elongation of the decorative layer under conditions at 180° C. can be suppressed.

With respect to the urethane acrylate oligomer used in the ultraviolet curing ink-jet ink, an aliphatic bifunctional urethane acrylate oligomer is preferably used. Specific examples include EB8411, EB8413, KRM7735, each of which is manufactured by Daicel-Cytec Company Ltd.; BEAMSET 504H, BEAMSET 505A-6, each of which is manufactured by Arakawa Chemical Industries, Ltd.; and CN959, CN966, CN9290, each of which is manufactured by Arkema K.K.

The urethane acrylate oligomer is preferably contained in the ultraviolet curing ink jet ink in an amount of 5 to 15% by mass, further preferably 5 to 12% by mass. When the amount of the urethane acrylate oligomer contained is 5% by mass or more, the decorative layer can be improved in the strength so that a crack is unlikely to be caused in the decorative layer or film substrate after preforming or after insert molding, and further a lowering of the application resistance (solvent resistance) can be suppressed. When the amount of the urethane acrylate oligomer contained exceeds 15% by mass, there is a possibility that the ink is increased in viscosity so that it is difficult to apply the ink by an ink-jet decorating apparatus.

Further, the urethane acrylate oligomer preferably has a coating film elastic modulus of 5 to 50 MPa under conditions at 25° C., further preferably 5 to 30 MPa. When the coating film elastic modulus is 5 MPa or more, the decorative layer can be improved in the strength so that a crack is unlikely to be caused in the decorative layer or film substrate after preforming or after insert molding. Further, when the coating film elastic modulus is 50 MPa or less, a lowering of the elongation of the decorative layer under conditions at 180° C. can be suppressed.

In the present specification, the term "coating film elastic modulus" means a coating film elastic modulus of a coating film formed from the urethane acrylate oligomer. Specifically, the coating film elastic modulus can be determined by a method in which an urethane acrylate oligomer and Irgacure 184 (photo-radical polymerization initiator, manufactured by BASF Japan Ltd.) are mixed in a 100:5 ratio (mass ratio), and the resultant mixture is applied using an applicator so that the resultant film has a thickness of 125 μm, and irradiated at a peak illuminance of 500 mW/cm$^2$ at an irradiation of 800 mJ/cm$^2$ to form a coating film, and then the coating film is cut into a strip form and subjected to measurement of an elastic modulus using an autograph at a rate of pulling of 200 mm/min. Details of the measurement of an elastic modulus are in accordance with JIS K7161.

In the invention, in addition to the above-mentioned monomers and oligomer, various reactive diluents can be added in such an amount that the elongation of the decorative layer is not adversely affected. When a bifunctional or multifunctional acrylate is added as another reactive diluent, the bifunctional or multifunctional acrylate is preferably contained in the ultraviolet curing ink-jet ink in an amount of 5% by mass or less, more preferably 2% by mass or less. As the amount of the bifunctional or multifunctional acrylate contained is increased, the decorative layer tends to become poor in the flexibility. When the amount of the bifunctional or multifunctional acrylate contained is 5% by mass or less, it is possible to suppress an adverse effect on the elongation of the decorative layer.

With respect to the photopolymerization initiator used in the ultraviolet curing ink jet ink, a photo-radical polymerization initiator is preferred. Examples of photo-radical polymerization initiators include benzoin, thioxanthone, benzophenone, ketal, and acetophenone initiators, and these can be used individually or two or more of them can be used in combination.

The amount of the photopolymerization initiator contained is preferably 3 to 15% by mass, more preferably 5 to 12% by mass, based on the mass of the ultraviolet curing ink-jet ink. When the amount of the photopolymerization initiator contained is 3% by mass or more, the polymerization can be advanced to satisfactorily cure the decorative layer. When the amount of the photopolymerization initiator contained exceeds 15% by mass, the improvement of the curing rate or curing speed expected by using the initiator in such a large amount cannot be obtained, and further the cost is increased.

With respect to the colorant used in the ultraviolet curing ink-jet ink, there is no particular limitation, but, when the decorative film is required to have a weathering resistance or a light resistance, a pigment is preferably used, and any of organic and inorganic pigments is arbitrarily selected.

Examples of organic pigments include a nitroso, a dyeing lake, an azo lake, an insoluble azo, a monoazo, a disazo, a condensed azo, a benzimidazolone, a phthalocyanine, an anthraquinone, a perylene, a quinacridone, a dioxazine, an isoindoline, an azomethine, and a pyrrolopyrrole, and these can be used individually or two or more of them can be used in combination.

Examples of inorganic pigments include oxides, hydroxides, sulfides, ferrocyanides, chromates, carbonates, silicates, phosphates, carbons (carbon black), and metal powders, and these can be used individually or two or more of them can be used in combination.

The amount of the colorant contained in the ultraviolet curing ink jet ink is preferably 0.01 to 10% by mass, more preferably 0.05 to 5% by mass. When the amount of the colorant contained is less than 0.01% by mass, there is a possibility that satisfactory coloring is not achieved. On the other hand, when amount of the colorant contained exceeds 10% by mass, there is a possibility that a discharge failure occurs during the ink jet decorating or a curing failure in the ink occurs.

Further, when the decorative film is not particularly required to have a weathering resistance or a light resistance, a dye can be used, and the dye to be used in such a case is not particularly limited and is arbitrarily selected.

Examples of dyes include oil-soluble dyes, such as an azo, an anthraquinone, an indigoid, a phthalocyanine, a carbonium, a quinoneimine, a methine, a xanthene, a nitro, and a nitroso, disperse dyes, acid dyes, reactive dyes, cationic dyes, and direct dyes.

Further, in the ultraviolet curing ink jet ink, if necessary, a dispersant may be added.

As a dispersant, one of a polymer type is preferred, and further, one having an acid adsorption group or basic adsorption group at the end is preferred. The amount of the dispersant added is preferably 0.01 to 1%, more preferably 0.1 to 0.5%, based on the mass of the colorant to which the dispersant is added. When the amount of the dispersant added is less than 0.01%, there is a possibility that a satisfactory dispersing effect cannot be obtained. On the other hand, when the amount of the dispersant added exceeds 1%, there is a possibility that the ink is increased in viscosity so that a discharge failure occurs during the ink jet decorating.

In addition, in the ultraviolet curing ink jet ink, as an additive, for example, a light stabilizer, an ultraviolet light absorber, a heat stabilizer, an antioxidant, an antiseptic agent, a pH adjustor, an anti-foaming agent, a penetrating agent, a slip agent, or the like can be added. Further, for promoting an initiation reaction of the photo-radical polymerization initiator, an auxiliary, such as a sensitizer, can also be used.

The ultraviolet curing ink-jet ink preferably has a viscosity of 5 to 20 cps (centipoises), that is, 5 to 20 mPa·s, further preferably 10 to 15 cps, as measured under conditions at 60° C. When the viscosity of the ink is less than 5 cps or more than 20 cps, there is a possibility that a discharge failure occurs during the ink-jet decorating.

The ultraviolet curing ink jet ink can be applied using a known ink-jet decorating apparatus. Examples of ink jet decorating apparatuses include those of a continuous system, such as a charge modulation system, a microdot system, an electrostatic jet control system, and an ink mist system, and those of an on-demand system, such as a piezoelectric system, a bubble-jet (registered trademark) system, and an electrostatic suction system, and an apparatus of any system can be employed.

The amount of the ink applied is preferably 1 to 150 $g/m^2$, more preferably 5 to 100 $g/m^2$. When the amount of the ink applied is 1 $g/m^2$ or more, a satisfactory coloring expression can be made, and, when the amount of the ink applied is 150 $g/m^2$ or less, the decorative film can be prevented from becoming poor in the moldability.

Further, the curing conditions for the ultraviolet curing ink jet ink and the like may be appropriately selected from known techniques.

If necessary, for imparting a further function, design property, or bonding property to the upper portion of the ultraviolet curing ink-jet ink layer, the ink layer may have a coating layer in a range such that the elongation is not adversely affected. The coating method and coating composition for the coating layer may be appropriately selected from known techniques.

FIG. 1 diagrammatically shows the cross-sectional structure of a decorative film (1) according to one embodiment. The decorative film (1) has, on one surface of a film substrate (2), a decorative layer (3) formed from an ultraviolet curing ink-jet ink. A not shown synthetic resin layer, such as a protective layer, may be formed on the decorative layer (3), and a synthetic resin layer, such as a base layer, may be formed between the decorative layer (3) and the substrate film (2), and further, a synthetic resin layer, such as a bonding layer, may be formed on the back surface of the substrate film (1). In FIG. 1, the decorative layer (3) is shown as a continuous layer formed on the entire one surface of the film substrate (2), but, the decorative layer (3) may be formed as a discontinuous layer partially on one surface of the film substrate (2).

Insert molding using the decorative film can be performed by a known insert molding method. Preferably, in the first step, the decorative film is preliminarily preformed by vacuum forming processing or pressure forming processing, and, in the subsequent second step, injection molding using the preformed decorative film is performed.

Figure 2:
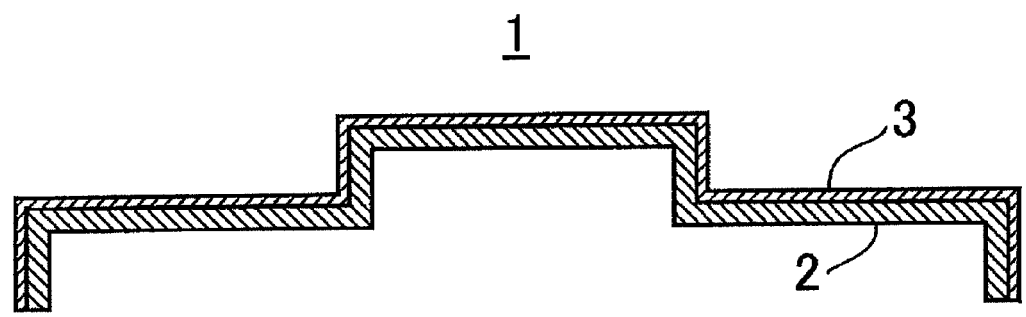
[FIG. 2] A cross-sectional view of the decorative film after preforming.

The preforming is forming the decorative film into a shape close to that of a final product prior to injection molding, and is also called preshaping. FIG. 2 shows an example of the preformed decorative film (1). As an apparatus for subjecting the decorative film to vacuum forming processing or pressure forming in the preforming, a known apparatus can be used, and the apparatus may be either unified with the above-mentioned ink-jet decorating apparatus or separated from it. Thus, in one embodiment, vacuum forming processing or pressure forming processing is performed, and vacuum pressure forming processing is included in these processing.

The vacuum forming is a method in which the decorative film is preliminarily preheated to a temperature at which the film is thermally deformable, and the resultant film is sucked by reducing the pressure in a mold and pressed to the mold and cooled while drawing the film to achieve forming of the film. The pressure forming is a method in which the decorative film is preliminarily preheated to a temperature at which the film is thermally deformable, and a pressure is applied to the resultant film from the side opposite to a mold and the film is pressed to the mold and cooled to achieve forming of the film. The vacuum pressure forming is a method in which the above-mentioned reducing the pressure and applying the pressure are simultaneously performed to achieve forming.

Figure 3:
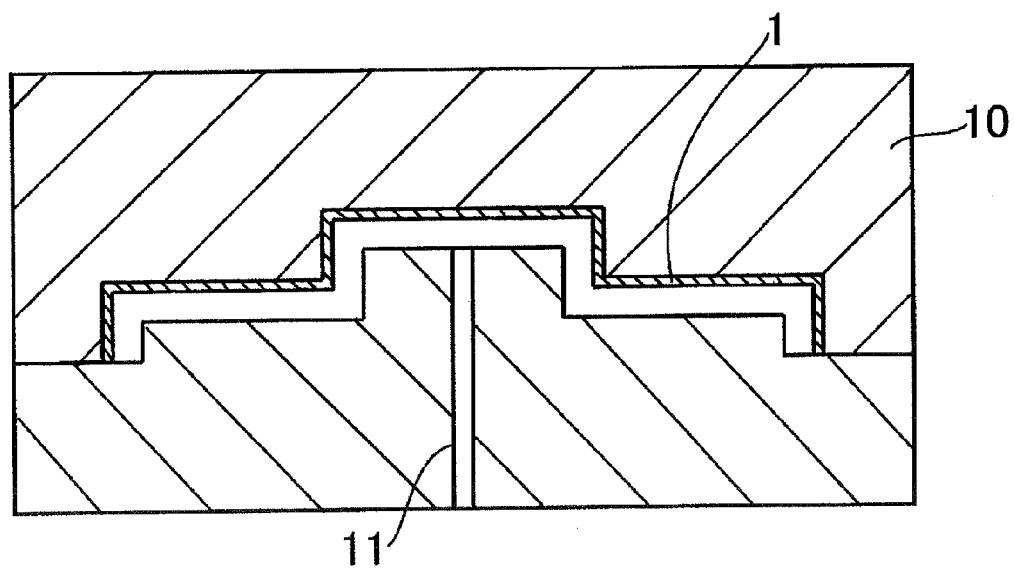
[FIG. 3] A cross-sectional view showing injection molding using the decorative film.

The injection molding in the insert molding can be performed using a known molding machine. For example, as shown in FIG. 3, the preformed decorative film (1) is placed in an injection mold (10), and the mold (10) is closed and then, a molten synthetic resin is injected into the cavity through a gate portion (11). Thus, a resin injection-molded body can be stacked on and unified with one surface of the decorative film (1).

Figure 4:
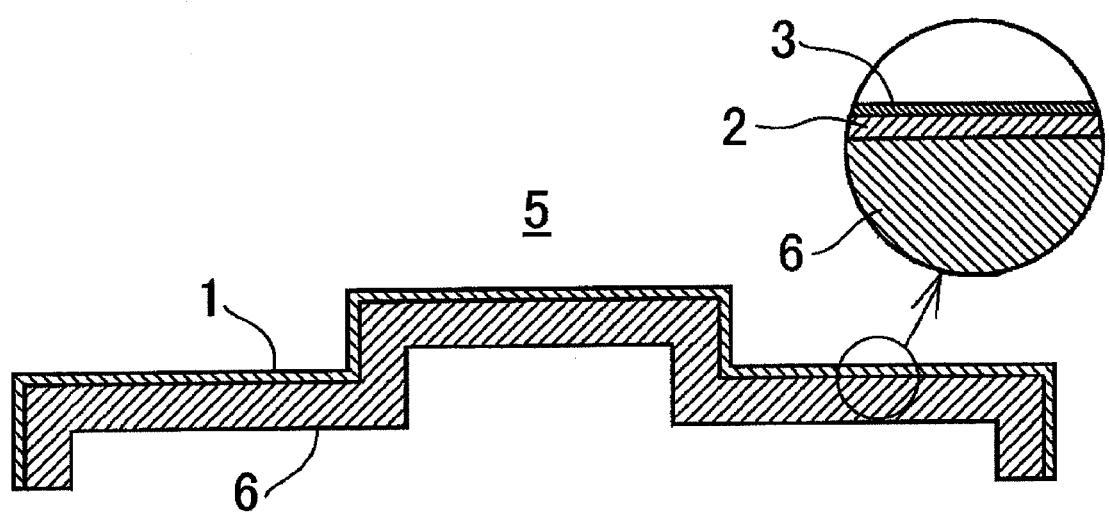
[FIG. 4] A cross-sectional view of a decorative insert molded article according to one embodiment.

FIG. 4 shows an example of the thus obtained decorative insert molded article (5). The decorative insert molded article (5) has a decorative film (1) and a resin injection-molded body (6) stacked on and unified with one surface of the decorative film. In this example, the decorative layer (3) is formed on the top surface of the substrate film (2) and the resin injection-molded body (6) is formed on the bottom surface of the substrate film (2) so that the decorative layer (3) is present on the top side of the molded article. Conversely, the resin injection-molded body (6) may be stacked on and unified with the surface of the decorative film (1) on the side on which the decorative layer (3) is formed so that the substrate film (2) is present on the top side of the molded article.

With respect to the use of the decorative insert molded article, there is no particular limitation, and, for example, the decorative insert molded article can be used to constitute part of a housing for various electric products, such as household electric appliances and communication devices, and can be used as an interior part for a vehicle, such as an automobile.

EXAMPLES

Hereinbelow, explanation will be made with reference to the following Examples. The present invention is not limited to the following Examples.

Example 1

First, the materials in accordance with the formulation shown below were mixed together using a mixer, and then dispersed by means of a bead mill for 3 minutes, and subjected to filtration, obtaining an ultraviolet curing ink jet ink.

<Ultraviolet Curing Ink-Jet Ink Formulation>

| | |
|---|---|
| MEDOL-10 <br> ((2-Methyl-2-ethyl-1,3-dioxolan-4-yl)methyl acrylate, manufactured by Osaka Organic Chemical Industry Ltd.; low-Tg monofunctional monomer) | 42% by mass |
| ACMO <br> (Acryloylmorpholine, manufactured by Kohjin Co., Ltd.; high-Tg monofunctional monomer) | 35% by mass |
| IBXA <br> (Isobornyl acrylate, manufactured by Kyoeisha Chemical Co., Ltd.; medium-Tg monofunctional monomer) | 4.5% by mass |
| IRGALITE BLUE GLNF <br> (Pigment, copper phthalocyanine, manufactured by Ciba Specialty Chemicals Inc.) | 2% by mass |
| FLOWLEN DOPA-33 <br> (Dispersant, modified acrylic copolymer, manufactured by Kyoeisha Chemical Co., Ltd.) | 1% by mass |
| Ebecryl 8411 <br> (Aliphatic urethane acrylate oligomer, manufactured by Daicel-Cytec Company Ltd.) | 7% by mass |
| Irgcure 184 <br> (Photo-radical polymerization initiator, 1-hydroxycyclohexyl phenyl ketone, manufactured by BASF Japan Ltd.) | 5% by mass |
| Lucirin TPO <br> (Photo-radical polymerization initiator, 2,4,6-trimethylbenzoyldiphenylphosphine oxide, manufactured by BASF Japan Ltd.) | 3% by mass |
| BYK-UV 3570 <br> (Slip agent, polyester-modified polydimethylsiloxane having an acrylic group, manufactured by BYK Japan K.K.) | 0.5% by mass |

<Method for Measuring a Viscosity>

In the present Examples, the measurement of a viscosity was performed using a Brookfield viscometer: Viscoblock Model VTB-250 (manufactured by Toki Sangyo Co., Ltd.) under conditions at 60° C. using a rotor at a rotational speed of 60 rpm.

An ultraviolet curing ink-jet ink was applied to a polycarbonate film (Iupilon NF-2000, manufactured by Mitsubishi Gas Chemical Company, Inc.; thickness: 0.5 mm; elongation under conditions at 180° C.: 240%; elongation under conditions at 25° C.: 120%) using an ink-jet decorating apparatus. Application conditions and curing conditions for the ultraviolet curing ink jet ink were set as follows.

<Application Conditions>
 Head heating temperature: 60° C.
 Nozzle diameter: 70 μm
 Applied voltage: 50 V
 Pulse width: 20 μs
 Driving frequency: 5 kHz
 Resolution: 360×720 dpi
 Amount of ink applied: 50 g/m$^2$
 Pattern: 5 mm×5 mm check pattern <Curing conditions>
 Type of lamp: Metal halide lamp
 Output: 80 W/cm
 Irradiation time: 0.3 second×4 times irradiation
 Irradiation height: 10 mm In this instance, the peak illuminance was 800 mW/cm$^2$, and the irradiation was 1,000 mJ/cm$^2$.

A decorative film in Example 1 was obtained through the above steps. With respect to the obtained decorative film, elongations under the respective temperature conditions are shown in Table 1.

In Examples 2 to 6 and Comparative Examples 1 to 3, decorative films were individually obtained in substantially the same manner as in Example 1 except that an ultraviolet curing ink jet ink prepared in accordance with the ink formulation shown in Table 1 was used.

In Table 1, the details of "KRM7735", "EB8804", "M-140", "V#150", "FA-511AS", and "SR217" are as follows.

KRM7735: Aliphatic urethane acrylate oligomer, manufactured by Daicel-Cytec Company Ltd.

EB8804: Aliphatic urethane acrylate oligomer, manufactured by Daicel-Cytec Company Ltd.

M-140: N-Acryloyloxyethylhexahydrophthalimide, manufactured by Toagosei Co., Ltd.

V#150: Tetrahydrofurfuryl acrylate, manufactured by Osaka Organic Chemical Industry Ltd.

FA-511AS: Dicyclopentenyl acrylate, manufactured by Hitachi Chemical Co., Ltd.

SR217: 4-tert-Butylcyclohexanol acrylate, manufactured by Arkema K.K.

[Evaluation: Flexibility Upon Preforming]

The decorative films in the Examples and Comparative Examples were individually subjected to preforming by vacuum forming in accordance with the following method. Using a vacuum forming apparatus Forming 300× (manufactured by Seikosangyo Co., Ltd.), vacuum forming was performed. The temperature of a heater was set so that the temperature of the surface of a decorative film became 180° C., and a metallic mold having a width of 6 cm×a length of 10 cm×a height of 6 cm was placed on the center of a vacuum table to perform vacuum forming. Then, the state of the decorative layer and film substrate in the formed film was visually examined, and evaluated according to the following criteria.

O: A defect, such as a crack, is not recognized in any of the decorative layer and the film substrate.

Δ: A defect, such as a crack, is recognized in any one of the decorative layer and the film substrate.

X: A defect, such as a crack, is recognized in both the decorative layer and the film substrate.

[Evaluation: Flexibility after Preforming]

With respect to the decorative film which had been subjected to vacuum forming under the same conditions as those shown above for the evaluation of flexibility upon preforming, flexibility was evaluated by the following method.

In accordance with JIS K5600 5-1, a flexing resistance test was performed by a cylindrical mandrel method. The mandrel had a diameter of 5 mm. Then, the state of the decorative layer and film substrate in the formed film was visually examined, and evaluated according to the criteria shown below. The "defect" in the Evaluation items below means a defect caused in the flexing resistance test, and the defect which had been caused upon preforming was eliminated in the evaluation.

(Evaluation Items)

O: A defect, such as a crack, is not recognized in the decorative film even when bent at 180°.

Δ: A defect, such as a crack, is not recognized in the decorative film even when bent at 90°, but a defect is seen when bent at 180°.

X: A defect, such as a crack, is recognized in the decorative film when bent at 90°.

As can be seen from Table 1, all the decorative films in Examples 1 to 6 had both excellent flexibility upon preforming and excellent flexibility after preforming. Therefore, the decorative films in Examples 1 to 6 have both excellent flexibility upon insert molding and excellent flexibility after insert molding.

On the other hand, the decorative film in Comparative Example 1 had excellent flexibility after preforming, but the decorative layer did not follow the film substrate upon preforming, so that a crack was caused in the decorative layer.

Further, the decorative film in Comparative Example 2 had excellent flexibility upon preforming, but had poor flexibility after preforming Furthermore, the decorative film in Comparative Example 3 had poor flexibility upon preforming.

INDUSTRIAL APPLICABILITY

The decorative film of the present invention can be advantageously used as a film for decorating the surface of various synthetic resin molded articles.

REFERENCE SIGNS LIST

1: Decorative film; 2: Film substrate; 3: Decorative layer; 5: Decorative insert molded article; 6: Resin injection-molded body

The invention claimed is:

1. A decorative film for insert molding, the decorative film having on a film substrate a decorative layer formed from an ultraviolet curing ink-jet ink, wherein the elongation of the decorative film for insert molding is 150% or more under conditions at 180° C. and 50% or more under conditions at 25° C., wherein the ultraviolet curing inkjet ink used in the decorative layer contains a monofunctional monomer having a glass transition temperature (Tg) of: 100° C.<Tg≤200° C., a monofunctional monomer having a Tg of: 0° C.<Tg≤100° C., a monofunctional monomer having a Tg of: Tg ≤0° C., a urethane acrylate oligomer, a photopolymerization initiator, and a colorant.

2. The decorative film for insert molding according to claim 1, wherein the ultraviolet curing ink-jet ink contains 25 to 45% by mass of the monofunctional monomer having: 100° C.<Tg≤200° C., 2 to 15% by mass of the monofunctional monomer having: 0° C.<Tg≤100° C. 25 to 45% by

TABLE 1

| | | Exp. 1 | Exp. 2 | Exp. 3 | Exp. 4 | Exp. 5 | Exp. 6 | Comp. Exp. 1 | Comp. Exp. 2 | Comp. Exp. 3 |
|---|---|---|---|---|---|---|---|---|---|---|
| Ink formulation (mass %) | IRGALITE BLUE GLNF (Pigment) | 2 | 2 | 2 | 2 | 2 | 2 | 2 | 2 | 2 |
| | DOPA-33 (Dispersant) | 1 | 1 | 1 | 1 | 1 | 1 | 1 | 1 | 1 |
| | EB8411 (Oligomer, coating film elastic modulus = 10 MPa) | 7 | 7 | 7 | 7 | — | — | 7 | 7 | — |
| | KRM7735 (Oligomer, coating film elastic modulus = 50 MPa) | — | — | — | — | 7 | 7 | — | — | — |
| | EB8804 (Oligomer, coating film elastic modulus = 250 MPa) | — | — | — | — | — | — | — | — | 7 |
| | MEDOL-10 (Low-Tg monofunctional monomer; Tg = −7° C. | 42 | — | 42 | 35 | 40 | 40 | 50 | 20 | 42 |
| | V#150 (Low-Tg monofunctional monomer; Tg = −16° C. | — | 42 | — | — | — | — | — | — | — |
| | SR217 (Medium-Tg monofunctional monomer; Tg = 45° C. | — | — | — | — | — | 11.5 | — | — | — |
| | M-140 (Medium-Tg monofunctional monomer; Tg = 56° C. | — | — | — | 4.5 | 11.5 | — | — | — | — |
| | IBXA (Medium-Tg monofunctional monomer; Tg = 88° C. | 4.5 | 4.5 | 4.5 | — | — | — | 11.5 | 11.5 | 4.5 |
| | ACMO (High-Tg monofunctional monomer; Tg = 140° C. | 35 | 35 | — | 42 | 30 | 30 | 20 | 50 | 35 |
| | FA-511AS (High-Tg monofunctional monomer; Tg = 125° C. | — | — | 35 | — | — | — | — | — | — |
| | Irgcure 184 (Photopolymerization initiator) | 5 | 5 | 5 | 5 | 5 | 5 | 5 | 5 | 5 |
| | Lucirin TPO (Photopolymerization initiator) | 3 | 3 | 3 | 3 | 3 | 3 | 3 | 3 | 3 |
| | BYK-UV3570 (Slip agent) | 0.5 | 0.5 | 0.5 | 0.5 | 0.5 | 0.5 | 0.5 | 0.5 | 0.5 |
| Viscosity (cps) | Under conditions at 60° C. | 10.8 | 9.5 | 11.5 | 11.7 | 10.5 | 9.2 | 10.3 | 11.8 | 11.2 |
| Decorative film elongation (%) | Under conditions at 180° C. | 190 | 150 | 160 | 220 | 150 | 150 | 120 | 230 | 40 |
| | Under conditions at 25° C. | 120 | 180 | 100 | 70 | 120 | 110 | 120 | 3 | 80 |
| Evaluation | Flexibility upon preforming | O | O | O | O | O | O | X | O | X |
| | Flexibility after preforming | O | O | O | O | O | O | O | X | O | mass of the monofunctional monomer having: $Tg \leq 0°$ C., and 5 to 15% by mass of the urethane acrylate oligomer.

3. The decorative film for insert molding according to claim 1, wherein the urethane acrylate oligomer has a coating film elastic modulus of 5 to 50 MPa under conditions at 25° C.

4. The decorative film for insert molding according to claim 2, wherein the urethane acrylate oligomer has a coating film elastic modulus of 5 to 50 MPa under conditions at 25° C.

5. A decorative insert molded article comprising the decorative film according to claim 1, and a resin injection-molded body stacked on and unified with one surface of the decorative film.

6. A decorative insert molded article comprising the decorative film according to claim 2, and a resin injection-molded body stacked on and unified with one surface of the decorative film.

7. A decorative insert molded article comprising the decorative film according to claim 3, and a resin injection-molded body stacked on and unified with one surface of the decorative film.

8. A decorative insert molded article comprising the decorative film according to claim 4, and a resin injection-molded body stacked on and unified with one surface of the decorative film.

* * * * *